E. M. CORWIN.
COMPENSATING PENDULUM.
No. 185,016. Patented Dec. 5, 1876.
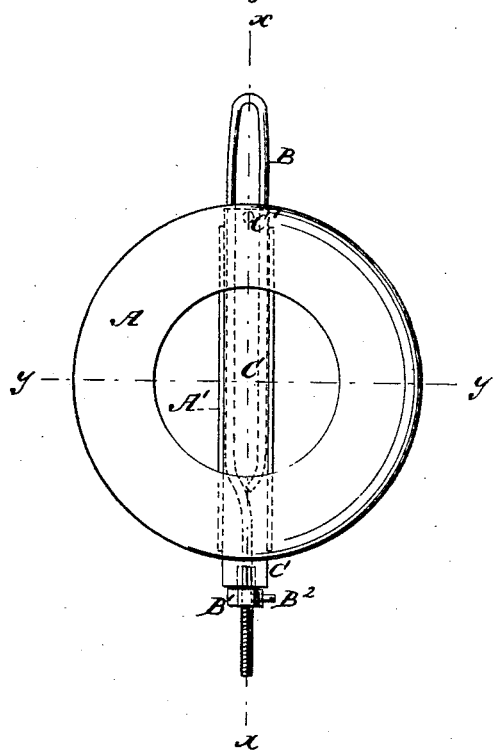
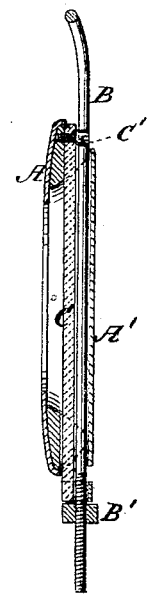
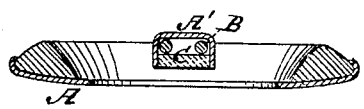
WITNESSES:
E. Wolff
J. H. Scarborough
INVENTOR:
E. M. Corwin
BY Munn & Co.
ATTORNEYS.

UNITED STATES PATENT OFFICE.

EBEN M. CORWIN, OF BARRY, ILLINOIS.

IMPROVEMENT IN COMPENSATING-PENDULUMS.

Specification forming part of Letters Patent No. 185,016, dated December 5, 1876; application filed October 30, 1876.

*To all whom it may concern:*

Be it known that I, EBEN MERTON CORWIN, of Barry, in the county of Pike and State of Illinois, have invented a new and Improved Compensating-Pendulum, of which the following is a specification:

Figure 1 is a front view of the pendulum ball or weight. Fig. 2 is a vertical section on line X. Fig. 3 is a horizontal section on line Y.

Similar letters of reference indicate corresponding parts.

In this invention the variations of the length of the suspending-rod or pendulum-wire B, due to different temperatures, are compensated by placing between the ball A and its supporting and regulating nut $B^1$ a piece of hard rubber, C, which, being secured to the ball A by the screw, pin, or projection $C'$ at one end, and resting upon the regulating-nut $B^1$ at the other, keeps the center of gravity of the ball A at a uniform distance from the point of suspension or commencement of motion.

For this purpose the length of the hard rubber between $C'$ and $B^1$ is proportioned to the length of the metal from $B^1$ to the point of suspension, exactly in the inverse ratio of the expansions of the two substances at equal temperatures. The ball A and rubber C are suspended by the wire B and regulating-screw and nut $B^1$, in the usual manner. The wire B is a portion of the suspending-rod, and the loop and corresponding hook may be dispensed with, and the nut $B^1$ screwed upon the rod itself, if desired. The nut $B^1$ is provided with a set-screw, $B^2$, to prevent accidental displacement after the clock has been regulated. The ball A has a metallic sheath or case, $A'$, which protects and guides the rubber C and wire B. The ball A is shown annular in form, but may be made of any suitable form or material.

The hard rubber C may be flat, as shown, or square or cylindrical, solid or hollow, as may be preferred.

Having thus described my invention, I claim as new and desire to secure by Letters Patent—

1. The combination of the hard rubber C with the suspending-rod B and ball A, substantially as and for the purposes set forth.

2. The combination of the hard rubber C with the ball A and protecting-sheath $A'$, substantially as herein shown and described.

3. The combination of the set-screw $B^2$ with the regulating-nut $B^1$ and wire B, as herein shown and described.

EBEN MERTON CORWIN.

Witnesses:
 GEO. A. FERGUSON,
 O. R. EMERSON.